(12) United States Patent
Tokuda

(10) Patent No.: US 9,996,021 B2
(45) Date of Patent: Jun. 12, 2018

(54) OPTICAL WRITING DEVICE AND IMAGE FORMING APPARATUS INCORPORATING SAME

(71) Applicant: Masashi Tokuda, Kanagawa (JP)

(72) Inventor: Masashi Tokuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

(21) Appl. No.: 15/427,122

(22) Filed: Feb. 8, 2017

(65) Prior Publication Data

US 2017/0242364 A1    Aug. 24, 2017

(30) Foreign Application Priority Data

Feb. 22, 2016   (JP) ................................. 2016-030955

(51) Int. Cl.
| | |
|---|---|
| *G03G 15/04* | (2006.01) |
| *H04N 1/06* | (2006.01) |
| *H04N 1/29* | (2006.01) |
| *H04N 1/047* | (2006.01) |
| *H04N 1/053* | (2006.01) |

(52) U.S. Cl.
CPC ....... *G03G 15/04036* (2013.01); *H04N 1/047* (2013.01); *H04N 1/053* (2013.01); *H04N 1/06* (2013.01); *H04N 1/295* (2013.01); *H04N 2201/0091* (2013.01); *H04N 2201/047* (2013.01); *H04N 2201/0471* (2013.01)

(58) Field of Classification Search
CPC .............................................. G03G 15/04036
See application file for complete search history.

(56) References Cited

U.S. PATENT DOCUMENTS

| | | |
|---|---|---|
| 5,861,824 A | 1/1999 | Ryu et al. |
| 2005/0243163 A1 | 11/2005 | Ozasa et al. |
| 2007/0206234 A1* | 9/2007 | Ozasa .................... H04N 1/506 358/471 |
| 2008/0143814 A1 | 6/2008 | Masui et al. |
| 2010/0045767 A1 | 2/2010 | Nihei et al. |
| 2011/0063401 A1 | 3/2011 | Ohide |

FOREIGN PATENT DOCUMENTS

| | | |
|---|---|---|
| EP | 2299390 A2 | 3/2011 |
| JP | 2011-059570 | 3/2011 |

OTHER PUBLICATIONS

Extended European Search Report dated Jun. 28, 2017.

* cited by examiner

*Primary Examiner* — Clayton E Laballe
*Assistant Examiner* — Jas Sanghera
(74) *Attorney, Agent, or Firm* — Harness, Dickey & Pierce, P.L.C.

(57) ABSTRACT

An optical writing device and an image forming apparatus incorporating the optical writing device. The optical writing device includes two or more light sources, a pixel clock generator to measure a scanning speed of one of the two or more light sources and generate a pixel clock of a cycle corrected according to the measured scanning speed, a pulse data generation and output unit to generate pulse width data and shift data for the pixel clock generated by the pixel clock generator to output the generated pulse width data and the generated shift data for each one of the two or more light sources, and a plurality of image pulse generation and output units to generate an image pulse. In the optical writing device, the plurality of image pulse generation and output units are supplied with the pixel clock in common.

7 Claims, 9 Drawing Sheets

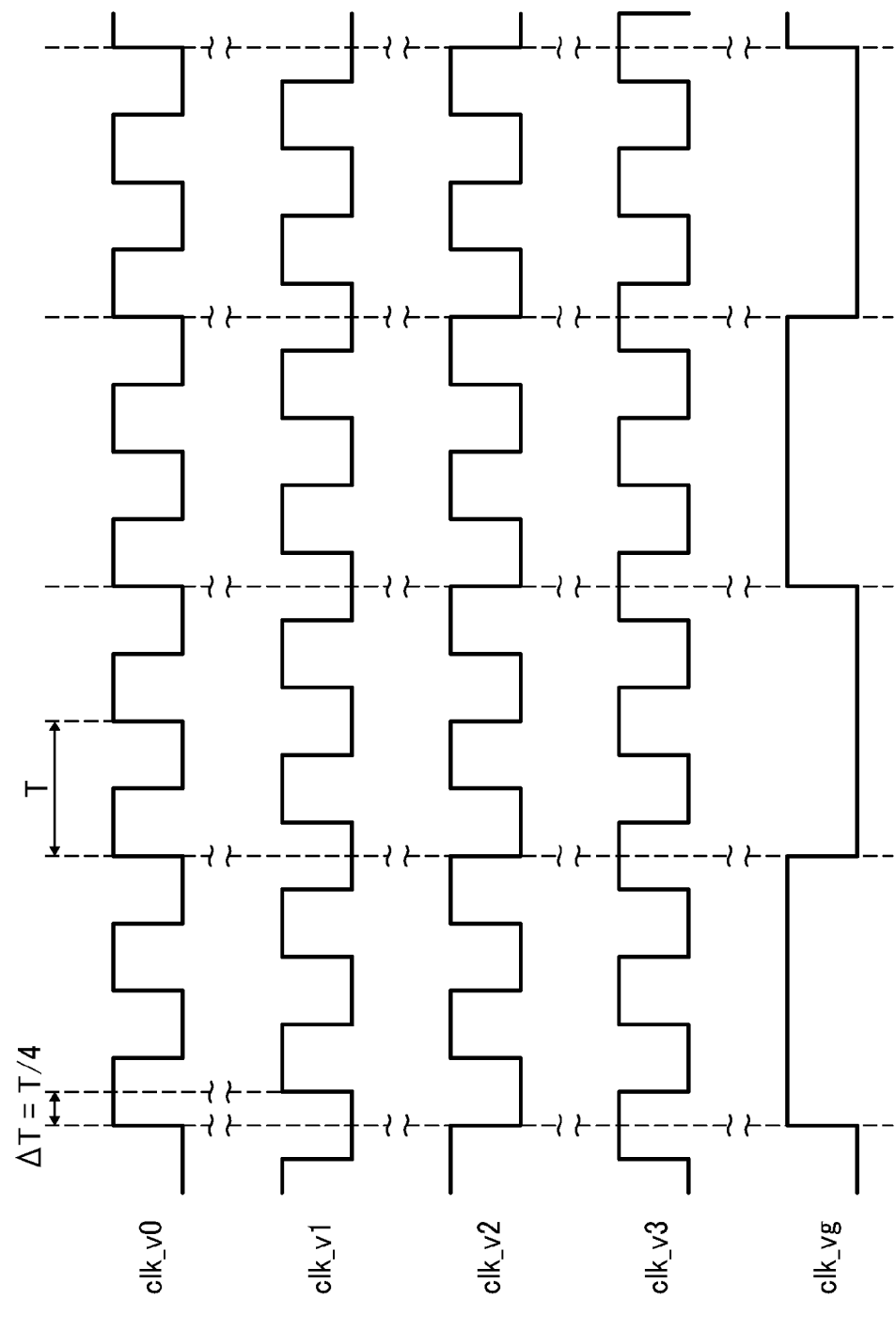

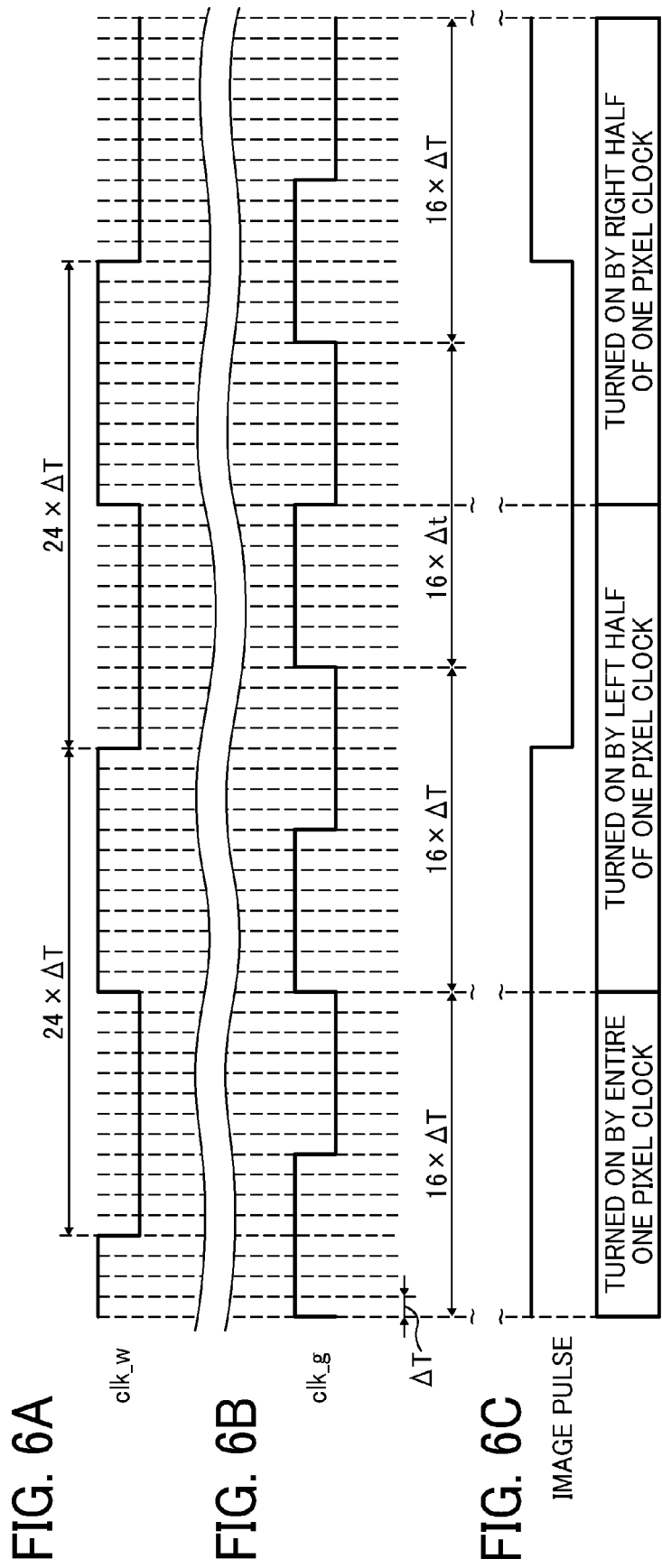

FIG. 7A clk_g

FIG. 7B clk_w

FIG. 7C REGISTER | 1ST PIXEL CLOCK | 1ST TO 2ND PIXEL CLOCK | 1ST TO 3RD PIXEL CLOCK | 1ST TO 4TH PIXEL CLOCK | 2ND TO 5TH PIXEL CLOCK | 3RD TO 6TH PIXEL CLOCK

FIG. 7D IMAGE PULSE (NO SHIFT)

FIG. 7E IMAGE PULSE (SHIFT TO LEFT)

FIG. 7F IMAGE PULSE (SHIFT TO RIGHT)

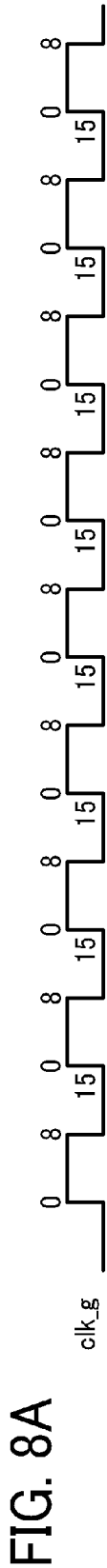
FIG. 8A  clk_g
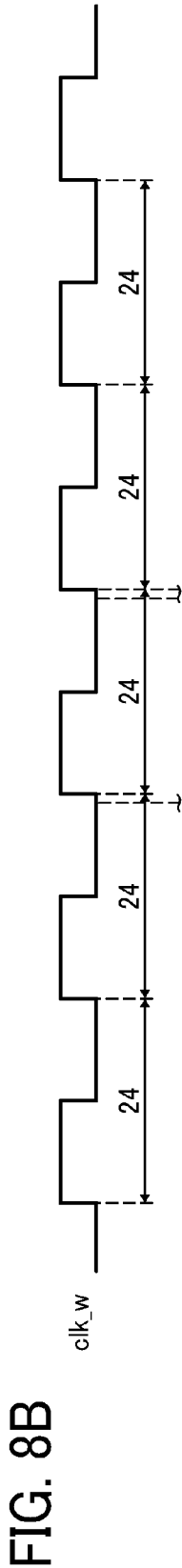
FIG. 8B  clk_w
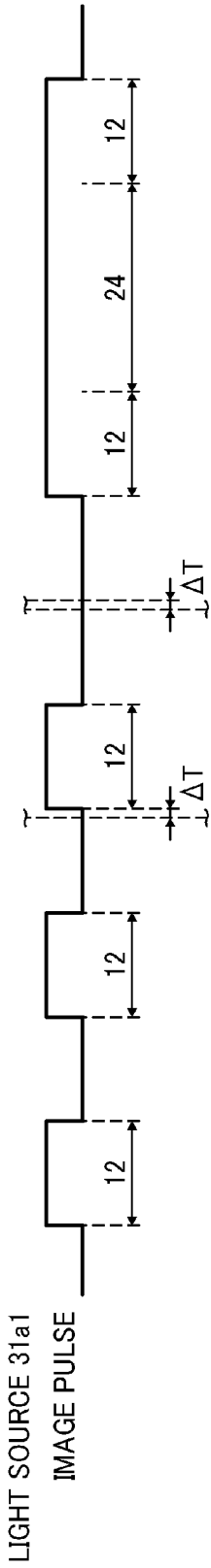
FIG. 8C  LIGHT SOURCE 31a1
IMAGE PULSE
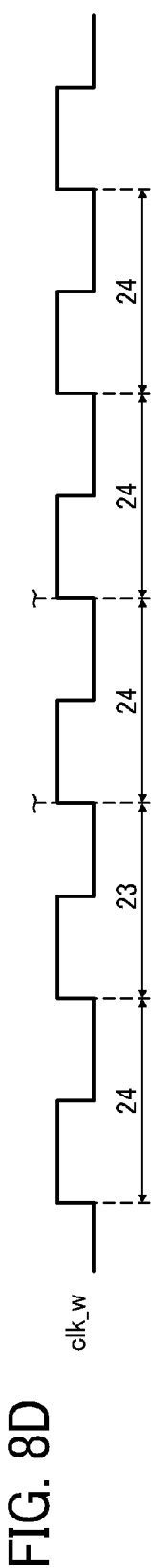
FIG. 8D  clk_w
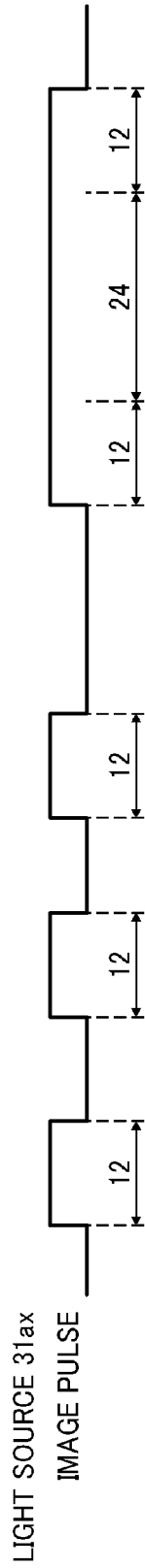
FIG. 8E  LIGHT SOURCE 31ax
IMAGE PULSE

OPTICAL WRITING DEVICE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2016-030955, filed on Feb. 22, 2016, in the Japan Patent Office, the entire disclosure of which is hereby incorporated by reference herein.

BACKGROUND

Technical Field

Embodiments of the present disclosure relate to an optical writing device and an image forming apparatus.

Background Art

Optical writing devices with a plurality of light sources are known that simultaneously scan a plurality of lines of the surface of a photoconductor by the laser beams emitted from these light sources to draw an electrostatic image. Such optical writing devices are used, for example, for a laser-beam printer and a digital copier.

Moreover, optical writing devices with a pixel clock generating function are known in the art.

SUMMARY

Embodiments of the present disclosure described herein provide an optical writing device and an image forming apparatus. The optical writing device includes two or more light sources, a pixel clock generator configured to measure a scanning speed of one of the two or more light sources and generate a pixel clock of a cycle corrected according to the measured scanning speed, a pulse data generation and output unit configured to generate pulse width data and shift data for the pixel clock generated by the pixel clock generator to output the generated pulse width data and the generated shift data for each one of the two or more light sources, and a plurality of image pulse generation and output units, disposed for the two or more light sources in association with each other, configured to generate an image pulse, having a pulse width determined by the pulse width data, where a pulse timing is shifted according to the shift data. In the optical writing device, the plurality of image pulse generation and output units are supplied with the pixel clock in common. The image forming apparatus includes the optical writing device, and an optical system configured to guide a plurality of laser beams emitted from the two or more light sources to scan a plurality of target surfaces with a time lag. Alternatively, the image forming apparatus includes the optical writing device, and an optical system configured to guide a plurality of laser beams emitted from the two or more light sources to scan a target surface.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 5A to FIG. 5D are timing charts of polyphase clock signals, according to a first embodiment of the present disclosure.

FIG. 5E is a timing chart of a clock signal for internal operation, according to a first embodiment of the present disclosure.

FIG. 6A is a timing chart of a clock signal for internal operation, according to a first embodiment of the present disclosure.

FIG. 6B is a timing chart of a pixel clock, according to a first embodiment of the present disclosure.

FIG. 6C is a timing chart of an image pulse, according to a first embodiment of the present disclosure.

FIG. 7A is a timing chart of a clock signal for internal operation, according to a first embodiment of the present disclosure.

FIG. 7B is a timing chart of a pixel clock, according to a first embodiment of the present disclosure.

FIG. 7C is a timing chart of the data stored in an interface (I/F) data holding register, according to a first embodiment of the present disclosure.

FIG. 7D is a timing chart of an image pulse with no shift, according to a first embodiment of the present disclosure.

FIG. 7E is a timing chart of an image pulse that is shifted to the left side, according to a first embodiment of the present disclosure.

FIG. 7F is a timing chart of an image pulse that is shifted to the left right, according to a first embodiment of the present disclosure.

FIG. 8A is a timing chart of a clock signal for internal operation, according to a first embodiment of the present disclosure.

FIG. 8B is a timing chart of a pixel clock, according to a first embodiment of the present disclosure.

FIG. 8C is a timing chart of an image pulse supplied to the light source $31a1$, according to a first embodiment of the present disclosure.

FIG. 8D is a timing chart of a pixel clock that corresponds to an image pulse supplied to a light source $31ax$, according to a first embodiment of the present disclosure.

FIG. 8E is a timing chart of an image pulse supplied to a light source $31ax$, according to a first embodiment of the present disclosure.

Figure 1:
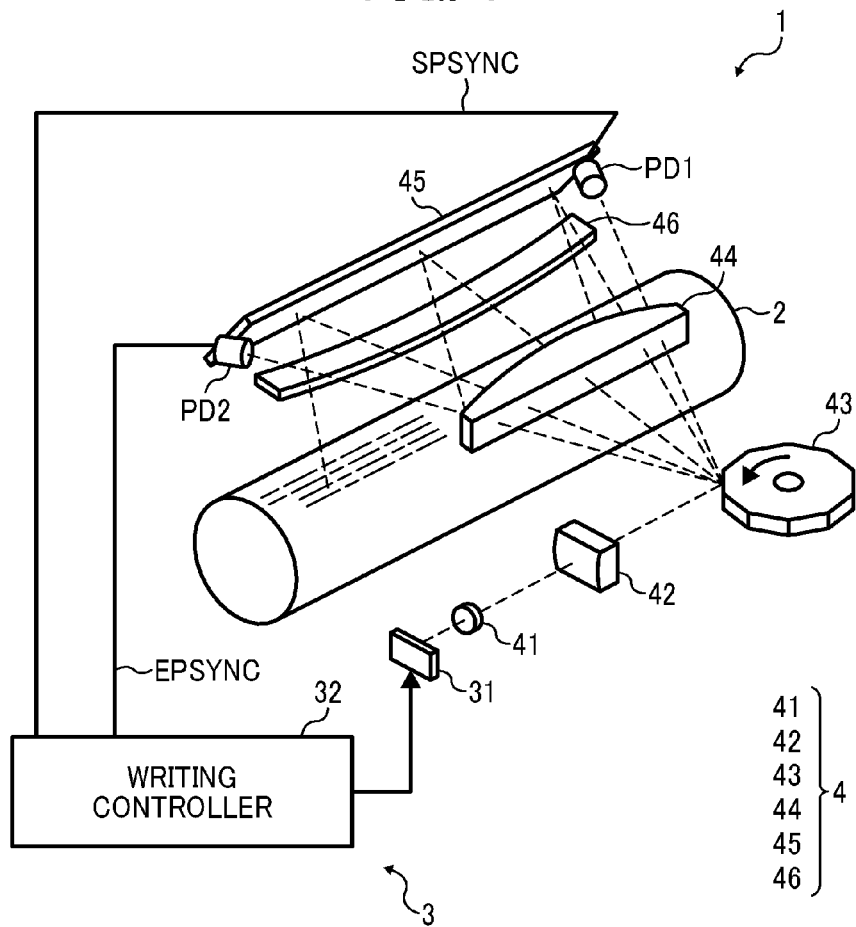
FIG. 1 is a view of an image forming apparatus into which an optical writing device according to a first embodiment of the present disclosure is incorporated.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

First Embodiment

In the following description, a first embodiment of the present disclosure is described with reference to FIG. 1 to FIG. 8.

FIG. 1 is a view of an image forming apparatus 1 into which an optical writing device 3 according to an embodiment of the present disclosure is incorporated.

As illustrated in FIG. 1, the image forming apparatus 1 includes a photoconductor 2, the optical writing device 3, and an optical system 4.

The photoconductor 2 is formed approximately in a cylindrical shape and rotates on its axis. The photoconductor 2 is negatively charged, and the minus charges are canceled at portions irradiated with light by the optical writing device 3. Accordingly, an electrostatic image is created. The optical writing device 3 irradiates the photoconductor 2 with light for forming an electrostatic image, as will be described later in detail.

The optical system 4 is disposed so as to scan the surface (a target surface) of the photoconductor 2 with the laser beam emitted from the optical writing device 3. The optical system 4 includes a collimator lens 41, a cylinder lens 42, a polygon mirror 43, a fθ lens 44, a mirror 45, a toroidal lens 46, and photodetectors PD1 and PD2.

The laser beam that is emitted from the optical writing device 3 is shaped as it is passing through the collimator lens 41 and the cylinder lens 42, and then strikes the polygon mirror 43 that is rotating. The polygon mirror 43 reflects the incident laser beam so as to scan the surface of the photoconductor 2 in a straight line. The laser beam that is reflected by the polygon mirror 43 is emitted onto the surface of the photoconductor 2 via the fθ lens 44, the mirror 45, and the toroidal lens 46, and forms a light spot.

On both sides of the above-described mirror 45, a photodetector PD1 and a photodetector PD2 are disposed, respectively. The photodetector PD1 and the photodetector PD2 detect the start and end of scanning of each one of the multiple laser beams emitted from the optical writing device 3, which will be described later in detail. In other words, the laser beam that is reflected by the polygon mirror 43 strikes the photodetector PD1 before scanning the surface of the photoconductor 2 in one line, and strikes the photodetector PD2 after completing the scanning. The photodetector PD1 and the photodetector PD2 convert the incident laser beam into a first synchronizing signal SPSYNC and a second synchronizing signal EPSYNC, respectively, and supply these signals to the optical writing device 3, which will be described later in detail.

Figure 2:
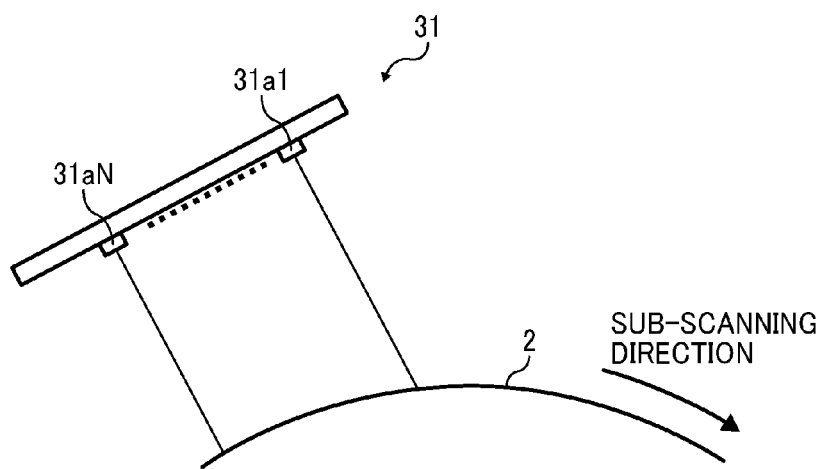
FIG. 2 is a view of the relative positions of a photoconductor and a light source mounted on a light-source substrate, each of which is illustrated in FIG. 1, according to a first embodiment of the present disclosure.

FIG. 2 is a view of the relative positions of the photoconductor 2 and a light source mounted on a light-source substrate 31, each of which is illustrated in FIG. 1, according to the present embodiment.

The optical writing device 3 includes the light-source substrate 31 on which a plurality of light sources $31a1$ to $31aN$ (see FIG. 2) of channel (ch) 1 to ch N are mounted, and a writing controller 32 that switches these light sources $31a1$ to $1aN$ on and off. A plurality of laser beams are emitted from the multiple light sources $31a1$ to $31aN$ of the light-source substrate 31, and a plurality of lines are simultaneously scanned by the optical system 4. Note that the multiple light sources $31a1$ to $31aN$ may be referred to simply as the light sources $31a$. Note also that the dotted lines in FIG. 1 are representative of one of the multiple laser beams emitted from the multiple light sources $31a1$ to $31aN$ mounted on the light-source substrate 31.

Figure 3:
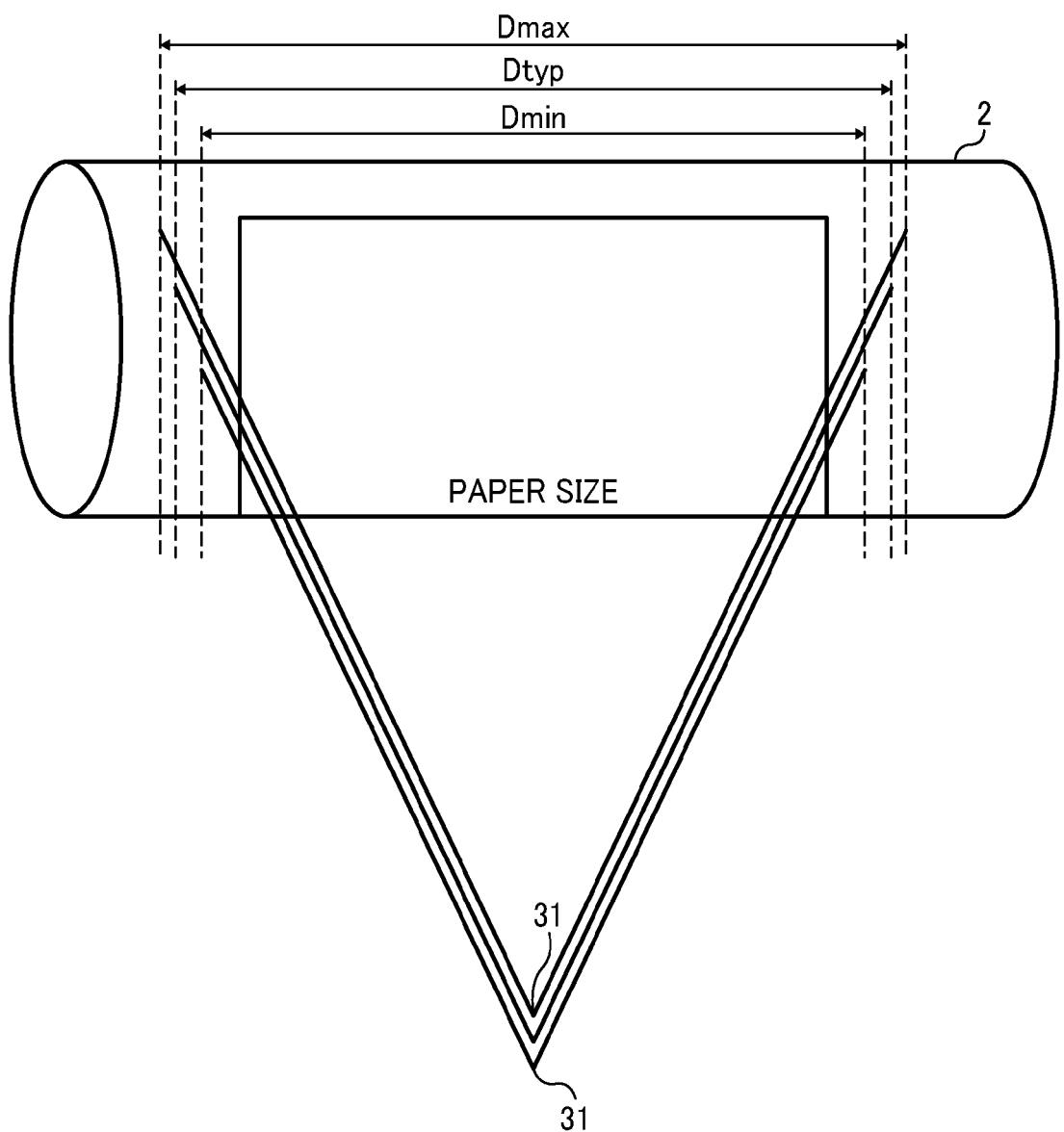
FIG. 3 is a view of the relative positions of a photoconductor and a light source mounted on a light-source substrate, each of which is illustrated in FIG. 1, according to a first embodiment of the present disclosure.

FIG. 3 is a view of the relative positions of the photoconductor 2 and a light source mounted on a light-source substrate 31, each of which is illustrated in FIG. 1, according to the present embodiment.

As illustrated in FIG. 2, the multiple light sources $31a$ are disposed so as to be separate from each other in the direction of rotation of the photoconductor 2, namely in the sub-scanning direction. As a matter of course, the light sources $31a$ may be aligned in a matrix. Each of the light beams that are emitted from the light sources $31a$ strikes the photoconductor 2 at an oblique angle. In other words, the distance to the photoconductor 2 varies for each one of the light sources $31a$. Due to such variations, the width of light spot on the photoconductor 2 irradiated by the light sources $31a$ varies for each one of the light sources $31a$. For this reason, if the multiple light sources $31a$ are controlled based on a single pixel clock signal, as illustrated in FIG. 3, the width D of a scanning line varies for each one of the light sources $31a$. In FIG. 3, Dmax denotes the width of scanning line of the light source $31a$ with the widest light spot, and Dmin denotes the width of scanning line of the light source $31a$ with the narrowest light spot. Moreover, Dtyp denotes the width of scanning line of the light source $31a$ with an average light spot. The writing controller 32 according to the present embodiment switches the multiple light sources $31a$ on and off, such that the scanning lines of the multiple light sources $31a$ have a uniform width.

Figure 4A:
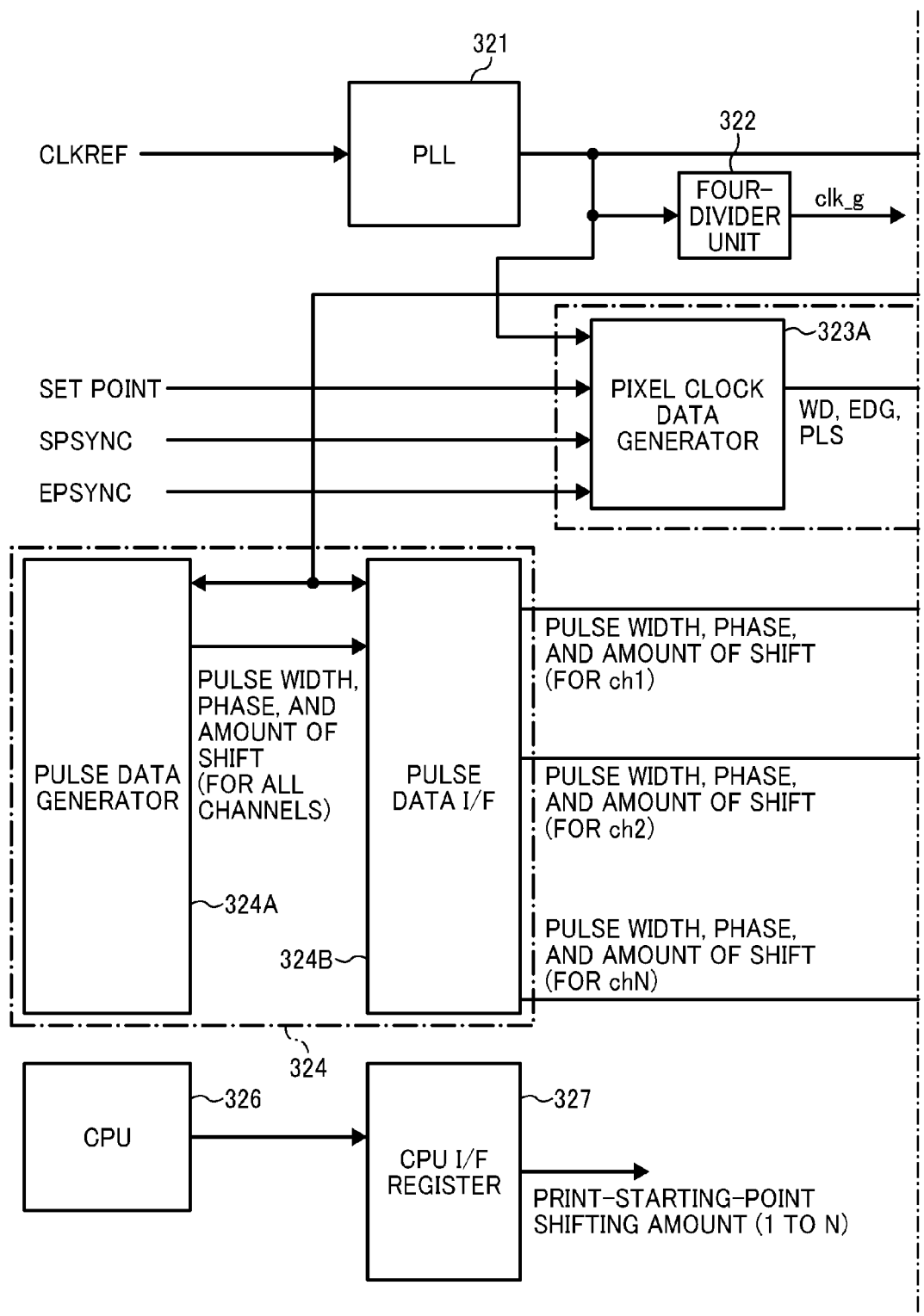
FIGS. 4A and 4B are block diagrams of a writing controller illustrated in FIG. 1, according to a first embodiment of the present disclosure.
Figure 4B:
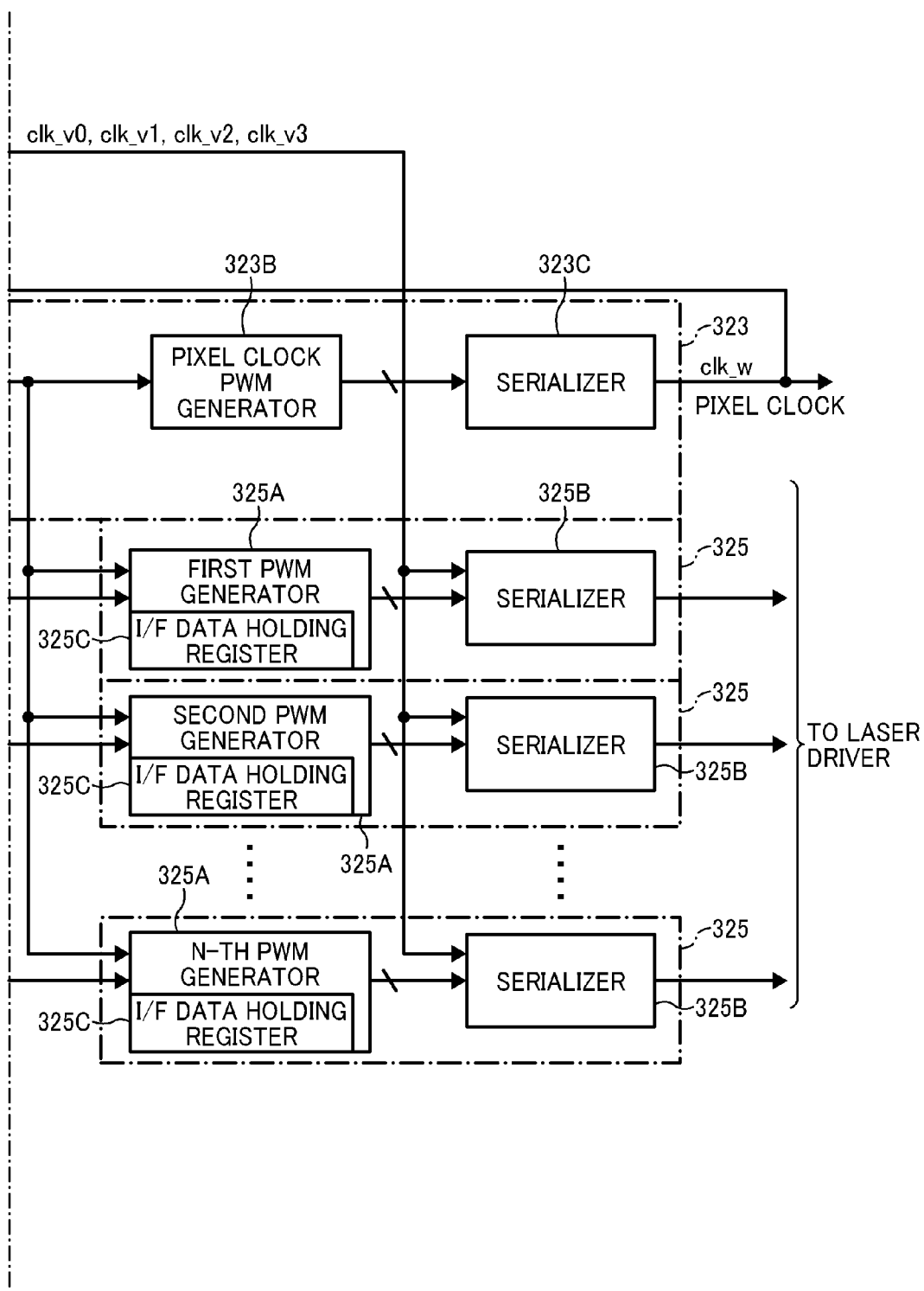

FIGS. 4A and 4B are block diagrams of the writing controller 32 illustrated in FIG. 1, according to the present embodiment.

As illustrated in FIG. 4A and FIG. 4B, the writing controller 32 includes a phase-locked loop (PLL) 321 that serves as a polyphase clock generator, four-divider unit 322, a pixel clock generator 323, a single pulse data generation and output unit 324, and a plurality of image pulse generation and output units 325.

FIG. 5A to FIG. 5D are timing charts of polyphase clock signals, according to the present embodiment.

FIG. 5E is a timing chart of a clock signal for internal operation, according to the present embodiment.

The PLL 321 is configured by a known PLL, and generates polyphase clock signals clk_v0, clk_v1, clk_v2, and clk_v3 where the phases are shifted and made different from each other by a phase difference $\Delta T=T/P$, based on a reference clock signal (see FIG. 5A to FIG. 5D). Note that T denotes a cycle and P denotes a number of phase. Note also that P=4 in FIG. 5A to FIG. 5E, but P may be set to any integral number.

The four-divider unit 322 is composed of a known divider, and divides one of the polyphase clock signals clk_v0 to clk_v3 into four to generate a clock signal for internal operation clk_g (see FIG. 5E). In the present embodiment, the four-divider unit 322 divides a polyphase clock signal clk_v0 to generate a clock signal for internal operation clk_g.

The pixel clock generator 323 measures the scanning speed of one of the multiple light sources 31a mounted on the light-source substrate 31, and generates pixel clock data and a pixel clock pulse of the cycle corrected according to the measured scanning speed. The pixel clock generator 323 includes a pixel clock data generator 323A, a pixel clock pulse-width modulation (PWM) generator 323B, a serializer 323C.

The pixel clock data generator 323A measures the scanning speed of one of the multiple light sources 31a mounted on the light-source substrate 31, and generates pixel clock data of the frequency corrected according to the measured scanning speed. To the pixel clock data generator 323A, the first synchronizing signal SPSYNC, the second synchronizing signal EPSYNC, the polyphase clock signals clk_v0 to clk_v3, and the clock signal for internal operation clk_g, as described above, are supplied. The time difference between the first synchronizing signal SPSYNC and the second synchronizing signal EPSYNC has a value determined by one of the scanning speeds of the multiple light sources 31a.

FIG. 6A is a timing chart of a clock signal for internal operation, according to the present embodiment.

FIG. 6B is a timing chart of a pixel clock, according to the present embodiment.

FIG. 6C is a timing chart of an image pulse, according to the present embodiment.

To the pixel clock data generator 323A, a set point is input. The pixel clock data generator 323A compares the measured time difference (scanning speed) with a set point, and sets the frequency of a pixel clock signal so as to be an integral multiple of a phase difference ΔT of polyphase clock signals clk_v0 to clk_v3. FIG. 6A, FIG. 6B, and FIG. 6C illustrate a case in which the cycle of a pixel clock signal clk_w is twenty-four times the phase difference ΔT. FIG. 6A, FIG. 6B, and FIG. 6C merely illustrate one example, and the cycle of a pixel clock signal clk_w may be any desired integral multiple, for example, twenty-three times or twenty-two times, of the phase difference ΔT according to the time difference between the first synchronizing signal SPSYNC and the second synchronizing signal EPSYNC.

The pixel clock data generator 323A outputs the generated data, related to a pixel clock signal clk_w, as pixel clock data. For example, such pixel clock data includes PLS, EDG, and WD. PLS indicates whether an edge of a pixel clock signal clk_w is included in the clock signal for internal operation clk_g. EDG indicates at what position of the one clock signal for internal operation clk_g the rising edge of the pixel clock signal clk_w is placed. WD indicates how many times the phase difference ΔT the cycle of the pixel clock signal clk_w is.

The pixel clock PWM generator 323B is supplied with the above-described PLS, EDG, and WD, and based on the supplied PLS, EDG, and WD, sequentially outputs the bit string of a pixel clock signal clk_w, which indicates "H" and "L" for each phase difference ΔT, in parallel, for each clock signal for internal operation clk_g. In other words, the pixel clock PWM generator 323B sequentially outputs a bit string of 16 bits of a pixel clock signal clk_w in parallel for each clock signal for internal operation clk_g.

More specifically, for example, in the clock signal for internal operation clk_g of FIG. 6B, the bit string of the pixel clock signal clk_w is "HHHHLLLLLLLLLLLL". The pixel clock PWM generator 323B is provided with 16-bit output terminal, and outputs the above-described bit string of 16 bits in parallel. The serializer 323C is supplied with polyphase clock signals clk_v0 to clk_v3, and sequentially outputs the bit string of 16 bits for each phase difference ΔT. Accordingly, the pulse of a pixel clock signal clk_w as illustrated in FIG. 6A is output.

As illustrated in FIG. 4A and FIG. 4B, the pulse data generation and output unit 324 includes a pulse data generator 324A and a pulse data interface (I/F) 324B.

The pulse data generator 324A is supplied with pixel clock signals clk_w, and outputs the pulse width data, the phase data, and the shift data of an image pulse of each pixel clock clk_w. The pulse width data, the phase data, and the shift data are sequentially output to all the light sources 31a. The pulse width data indicates a time during which the light sources 31a are turned on in one pixel clock signal clk_w, and the time is an integral multiple of a phase difference ΔT.

When the pixel clock signals clk_w are output at high speed, the pulse width data includes two kinds of data, i.e., full width of one pixel clock signal clk_w (turned on by entire one pixel clock signal clk_w) and 0 (turned off by entire one pixel clock signal clk_w). As illustrated in FIG. 6, when right half or left half of one pixel clock signal clk_w can be turned on, an image can be formed with doubled precision of a pixel clock signal clk_w.

The phase data indicates a phase difference between a pixel clock signal clk_w and an image pulse. Such phase data is not required in the above-described two cases of full width of one pixel clock signal clk_w and 0, but the phase data is required when right half or left half of one pixel clock signal clk_w is selectively turned on. The shift data indicates the amount of shift in image pulse for each pixel clock signal clk_w, which is used to align the width D of scanning line for each one of the light sources 31a as illustrated in FIG. 3, and the amount of shift is an integral multiple of a phase difference ΔT. As described above, if the multiple light sources 31a are controlled based on a single pixel clock signal clk_w, due to differences in distance between the light sources 31a and the photoconductor 2, the width of light spot on the photoconductor 2 irradiated by the light sources 31a varies for each one of the light sources 31a, and the width D of a scanning line varies as illustrated in FIG. 3.

FIG. 7A is a timing chart of a clock signal for internal operation, according to the present embodiment.

FIG. 7B is a timing chart of a pixel clock, according to the present embodiment.

FIG. 7C is a timing chart of the data stored in an interface (I/F) data holding register, according to the present embodiment.

FIG. 7D is a timing chart of an image pulse with no shift, according to the present embodiment.

FIG. 7E is a timing chart of an image pulse that is shifted to the left side, according to the present embodiment.

FIG. 7F is a timing chart of an image pulse that is shifted to the left right, according to the present embodiment.

Here, cases in which the light sources 31a perform scanning from left to right are described. To the light source 31a with the width of scanning line Dmax, shift data for shifting an image pulse to the left side as desired, as illustrated in FIG. 7E, is supplied to shorten the scanning line. The greater the shifting amount to the left side, the shorter the scanning line becomes. To the light source 31a with the width of scanning line Dmin, shift data for shifting an image pulse to the right side as desired, as illustrated in FIG. 7F, is supplied to lengthen the scanning line. In this case, the greater the shifting amount to the right side, the longer the scanning line becomes. To the light source 31a with the width of scanning line Dtyp, shift data for not shifting an image pulse, as illustrated in FIG. 7D, is supplied. The shift data is determined according to the relative positions of the light sources 31a and the photoconductor 2. More specifically, the width of scanning line D is actually measured in advance for each of the light sources 31a of the image forming apparatus 1, and the above-described shift data is adjusted in advance so as to align the measured values.

The pulse data interface 324B outputs the pulse width data, the phase data, and the shift data sent from the pulse data generator 324A in parallel for each of the light sources 31a.

The image pulse generation and output unit 325 is arranged for each one of the light sources 31a. The image pulse generation and output unit 325 includes a pulse-width modulation (PWM) generator 325A and a serializer 325B. To the PWM generator 325A, the pixel clock data including WD, EDG, and PLS are supplied from the pixel clock data generator 323A. Moreover, to the PWM generator 325A, the pulse width data, the phase data, and the shift data of each pixel clock signal are supplied from the pulse data interface 324B. The PWM generator 325A generates an image pulse, having a pulse width determined by the pulse width data, where the pulse timing is shifted according to the shift data in the generated image pulse. The PWM generator 325A is supplied with polyphase clock signals clk_v0 to clk_v3, and the pulse width of the image pulse is an integral multiple of the phase difference ΔT. The amount of shift is also an integral multiple of the phase difference ΔT.

FIG. 8A is a timing chart of a clock signal for internal operation, according to the present embodiment.

FIG. 8B is a timing chart of a pixel clock, according to the present embodiment.

FIG. 8C is a timing chart of an image pulse supplied to the light source 31a1, according to the present embodiment.

FIG. 8D is a timing chart of a pixel clock that corresponds to an image pulse supplied to the light source 31ax, according to the present embodiment.

FIG. 8E is a timing chart of an image pulse supplied to the light source 31ax, according to the present embodiment.

Hereinafter, the operation of the above-described PWM generator 325A is described in detail. For example, cases are described in which the shift data of an image pulse of the light source 31a1, output from the pulse data generation and output unit 324, is "0" in the first to sixth pixel clocks. In such cases, as illustrated in FIG. 8B and FIG. 8C, image pulses are output at the same time the pixel clock signals clk_w are generated by the pixel clock generator 323. Note also that, for example, a number "24" in FIG. 8A to FIG. 8E indicates "24×ΔT".

Next, cases are described in which the shift data of an image pulse of the light source 31ax ("x" denotes any integer) is "0" in the first to second and fourth to sixth pixel clocks and the third pixel clock is shifted to the left by the amount of one phase difference ΔT. In such cases, as illustrated in FIG. 8D and FIG. 8E, the image pulses in the first and second pixel clocks are output at the same time the pixel clock signals are generated by the pixel clock generator 323. The third pixel clock is virtually shifted to the left side by the amount of phase difference ΔT, and the image pulse in the third pixel clock is output at the timing of such a shifted pixel clock. As the PWM generator 325A performs shifting by an integrated value of shifting amounts, each of the fourth to sixth pixel clocks is also virtually shifted to the left side by the amount of phase difference ΔT, and image pulses are output at the timings of the shifted pixel clocks.

As described above, the PWM generator 325A integrates the shift data output from the pulse data generation and output unit 324, and shifts an image pulse according to an obtained integrated value. However, no limitation is intended thereby. The PWM generator 325A may receive shift data that is integrated in advance from the pulse data generation and output unit 324.

Moreover, the PWM generator 325A sequentially outputs the bit string of an image pulse, which indicates "H" and "L" for each phase difference ΔT, in parallel, for each clock signal for internal operation clk_g. In other words, the PWM generator 325A sequentially outputs a bit string of 16 bits of an image pulse in parallel for each clock signal for internal operation clk_g.

More specifically, for example, in the third-from-left clocks of the clock signals for internal operation clk_g in FIG. 8B and FIG. 8D, the bit string of the image pulse for the light source 31a1 is "HHHHLLLLLLLLLLLL", and the bit string of the image pulse for the light source 31ax is "HHHHLLLLLLLLLLLL". Each of the PWM generators 325A is provided with 16-bit output terminal, and outputs the above-described bit string of 16 bits in parallel. The serializer 325B is supplied with polyphase clock signals clk_v0 to clk_v3, and sequentially outputs the bit string of 16 bits for each phase difference ΔT. Accordingly, the image pulses as illustrated in FIG. 8C and FIG. 8E are output.

Due to the positional differences among the light sources 31a, as illustrated in FIG. 3, the print starting points are different from each other. The print starting point of the width of scanning line Dmax is at the left end, and the print starting point of the width of scanning line Dmin is at the right end. Due to this configuration, for the light source 31a with the width of scanning line Dmax, it is desired that the scanning be started with the print starting point shifted to the right. In order to handle such a situation, in the present embodiment, the writing controller 32 includes a CPU interface (I/F) register 327 (=first memory and second memory) that is writable by a CPU 326, and the CPU interface register 327 stores print-starting-point shift data for each of the light sources 31a. The PWM generator 325A reads from the CPU interface register 327 the print-starting-point shift data of the corresponding one of the light sources 31a, and shifts the image pulse of the first pixel clock in one scanning line according to the read print-starting-point shift data.

More specifically, the light source 31a with the width of scanning line Dmax is supplied with an image pulse having a large print-starting-point shifting amount as illustrated in FIG. 7E to delay the drawing processes, and the light source 31a with the width of scanning line Dtype is supplied with a pulse having a slightly large print-starting-point shifting amount as illustrated in FIG. 7D to slightly delay the drawing processes. The light source 31a with the width of scanning line Dmin is supplied with an image pulse having a print-starting-point shifting amount "0" as illustrated in FIG. 7F. Accordingly, the print starting point of the light source 31a with the width of scanning line Dmax is shifted to the right to a large degree, and the print starting point of the light source 31a with the width of scanning line Dtype is shifted to the right to a slight degree. As a result, the print starting points of the light sources 31a with the widths of scanning lines Dmax, Dmin, and Dtyp are aligned to the same position.

Each of the PWM generators 325A includes an interface (I/F) data holding register 325C (i.e., third memory) in which the pulse width data, the phase data, and the shift data of four pixel clock signals can be stored. Note that the pulse width data, the phase data, and the shift data may be referred to simply as "data" in the following description. More specifically, as illustrated in FIG. 7B and FIG. 7C, in the first to fourth pixel clocks, the PWM generator 325A sequentially stores the data of the first to fourth pixel clock signals in the interface data holding register 325C. At the fifth pixel clock, the PWM generator 325A deletes the data of the first pixel clock, which is the oldest data, and stores the data of the second to fifth pixel clock signals. In a similar manner, storing processes are repeated.

Then, the PWM generator 325A outputs an image pulse where the pixel clock is delayed by the amount of two pixel clocks with reference to the pixel clock of various kinds of data output from the pulse data interface 324B. In other words, an image pulse is output in a state where various kinds of data of two pixel clocks are prefetched. Due to this configuration, even if an integrated value of shift data increases to the left side by equal to or greater than one pixel clock signal clk_w, shifting can be performed.

As a result of repeatedly performing shift to the left side, as illustrated in FIG. 7E, at timings of outputting an image pulse of p-th pixel with no shift (p denotes any integer), an image pulse of p+1-th pixel may be output. In the present embodiment, image pulses of two pixels are read ahead, and thus an image pulse of n+1-th pixel is stored in the interface data holding register 325C at the timing of outputting an image pulse of p-th pixel. As described above, even if an integrated value of shift data increases to the left side by equal to or greater than one pixel clock signal clk_w, shifting can be performed.

In the pulse data interface 324B, the largest possible shifting amount due to the shift data is stored, and a printing is started in a state where half the largest possible shifting amount is read ahead. For example, when the largest possible integrated value of the shift data to the right and left are both two pixel clocks, as in the embodiments described above, the data of four pixel clocks may be stored, and a printing may be started in a state where half the data of four pixel clocks, i.e., two pixel clocks, are read ahead.

According to the embodiments as described above, the pixel clock generator 323 measures the scanning speed of one of the multiple light sources 31a, and generates a pixel clock of the cycle corrected according to the measured scanning speed. Moreover, a single pixel clock is used for the multiple light sources 31a in common. Accordingly, the frequency of a pixel clock can be corrected precisely without increasing the scale of the circuit. The pulse data generation and output unit 324 outputs the pulse width data and the shift data for each of the light sources 31a. Each of the image pulse generation and output units 325, which are disposed for the two or more light sources 31a in association with each other, generates an image pulse, having a pulse width determined by the pulse width data, where the pulse timing is shifted according to the shift data. Due to this configuration, even when the frequency of a pixel clock is corrected, the misalignment among the widths of scanning lines of the respective light sources 31a can be corrected. Accordingly, an image can be generated more precisely without increasing the scale of the circuit.

Moreover, according to the embodiments as described above, the PLL 321 is provided to generate a polyphase clock signal where the phase is shifted and made different from each other by a phase difference T/P, where T denotes a cycle and P denotes a number of phase. The pixel clock generator 323 corrects the cycle of a pixel clock so as to be an integral multiple of the phase difference T/P, and the pulse width data and the shift data are set so as to be an integral multiple of the phase difference T/P. Accordingly, a pixel clock can be corrected with a simplified configuration, and an image pulse can be output according to the corrected pixel clock.

According to the embodiments as described above, the CPU interface register 327 is provided to store print-starting-point shift data for each of the multiple light sources 31a, and each of the image pulse generation and output units 325 shifts the image pulse of the first pixel clock in one scanning line according to the print-starting-point shift data. Accordingly, the print starting points can be aligned as desired.

According to the embodiments as described above, the interface data holding register 325C is provided to store the pulse width data and the shift data, for each pixel clock, of a plurality of pixels (of four pixels in the present embodiment), output from the pulse data generation and output unit 324, and the image pulse generation and output unit 325 outputs an image pulse corresponding to a pixel clock delayed by a prescribed number of or more pixels (by two pixels in the present embodiment) with reference to the pixel clock determined by the pulse width data and the shift data output from the pulse data generation and output unit 324. Accordingly, a situation in which the shifting amount exceeds one pixel clock can be handled.

According to the embodiments as described above, the pulse width data indicates how many times the phase difference ΔT the pulse width is. Accordingly, in the present embodiment, the pulse data interface 324B is used to output twenty-five (=n) items of data including the minimum pulse width data (phase difference ΔT×1) to the maximum pulse width data (phase difference Δt×24). In the present embodiment, for example, three items of pulse width data to be used, including phase difference ΔT×24, the phase difference ΔT×12, and phase difference ΔT×0, are selected. Then, the selected three items of pulse width data and corresponding three items of selection data are stored in the CPU interface register 327. The pulse data generation and output unit 324 outputs the selection data as pulse width data. More specifically, the pulse data generation and output unit 324 calculates a pulse width according to the selection data output from the CPU interface register 327, and outputs an image pulse. Due to this configuration, the pulse data interface 324B is satisfactory as long as three items of selection data are output therefrom, and thus the scale of circuits from increasing can be reduced.

Second Embodiment

Figure 9:
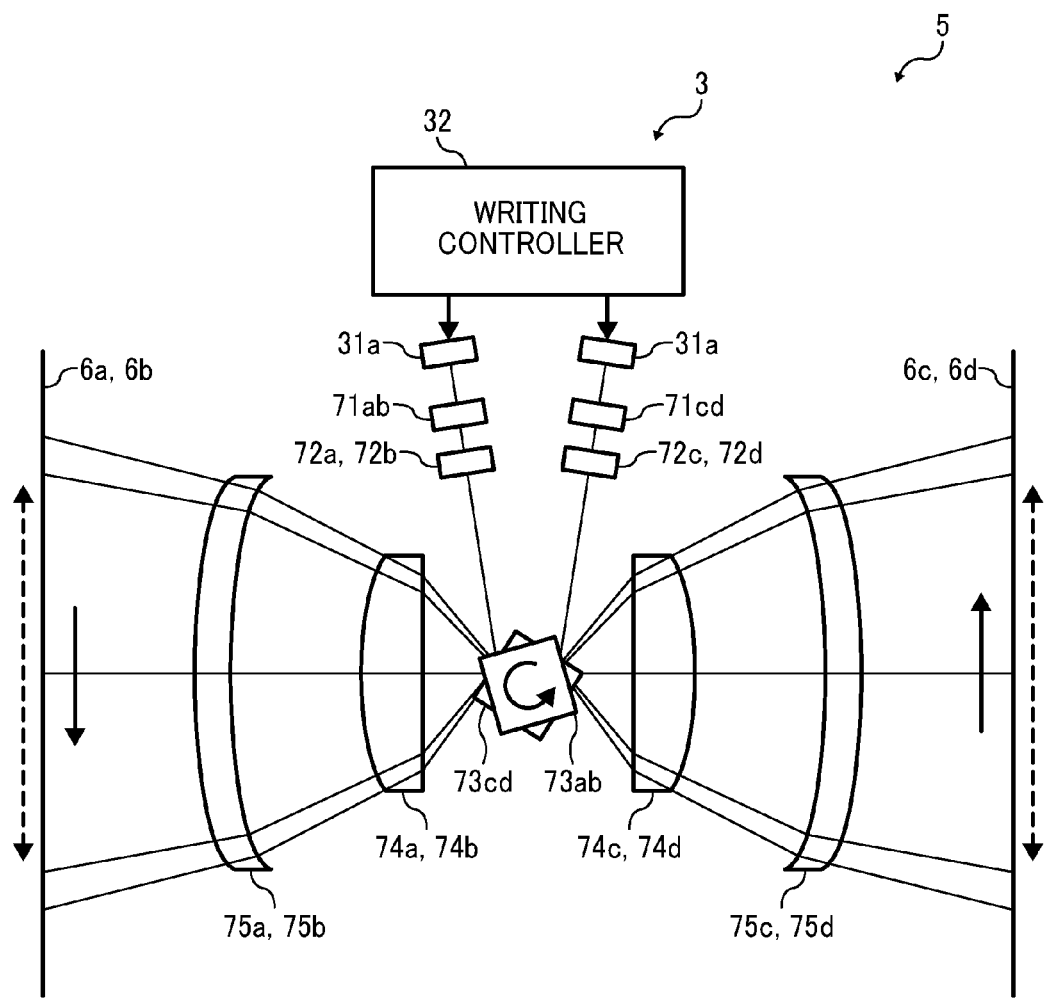
FIG. 9 is a view of an image forming apparatus into which an optical writing device according to a second embodiment of the present disclosure is incorporated.

FIG. 9 is a view of an image forming apparatus 5 into which the optical writing device 3 is incorporated, according to a second embodiment of the present disclosure.

In the first embodiment as described above, there is only one photoconductor (i.e., the photoconductor 2). However, the optical writing device 3 according to the first embodiment may be applied to image forming apparatus of laser-beam bundle splitting type, as illustrated in FIG. 9, in a second embodiment that is described below. Note that like reference signs are given to like elements similar to those described as above in the first embodiment, and their detailed description is omitted.

As illustrated in FIG. 9, the image forming apparatus 5 includes four photoconductors 6a to 6d, the optical writing device 3, and an optical system 7. The photoconductors 6a to 6d correspond to the colors magenta, yellow, black, and cyan. The optical writing device 3 according to the present embodiment is similar to that of the first embodiment except that two sets of light sources 31a are separately provided therefore, and thus its detailed description is omitted.

The optical system 7 includes a half mirror prisms 71ab and 71cd, cylindrical lenses 72a to 72d, an upper polygon mirror 73ab and a lower polygon mirror 73cd, first scanning lenses 74a to 74d and second scanning lenses 75a to 75d, and a mirror.

The half mirror prisms 71ab and 71cd are provided for each one of the light sources 31a to split the laser beam from the light source 31a in two in the sub-scanning direction. Firstly, the two laser beams that are split by the half mirror prism 71ab are described. The split two laser beams pass through the cylindrical lenses 72a and 72b, respectively, and strike the upper polygon mirror 73ab and the lower polygon mirror 73cd, respectively. The upper polygon mirror 73ab reflects the incident laser beam so as to scan the surface of the photoconductor 6a in a straight line. The lower polygon mirror 73cd reflects the incident laser beam so as to scan the surface of the photoconductor 6b in a straight line. The two laser beams that are reflected by the upper polygon mirror 73ab and the lower polygon mirror 73cd are emitted onto the surface of the photoconductors 6a and 6b, respectively, via the first scanning lenses 74a and 74b, the second scanning lenses 75a and 75b, and the mirror, and form a light spot. In a similar manner, the two laser beams that are split by the half mirror prism 71cd are emitted onto the surface of the photoconductors 6c and 6d, respectively.

Because the upper polygon mirror 73ab and the lower polygon mirror 73cd are offset by 45 degrees, while the laser beams that are reflected by the upper polygon mirror 73ab are being emitted onto the photoconductors 6a and 6c, the laser beams that are reflected by the lower polygon mirror 73cd are not emitted onto the photoconductors 6b and 6d. In other words, the laser beams that are emitted from the light source 31a scan the surface (target surface) of the multiple photoconductors 6a and 6b with a time lag. In a similar manner, the laser beams that are emitted from the light source 31a scan the surface of the multiple photoconductors 6c and 6d with a time lag.

As described above, the optical writing device 3 according to the present embodiment can control the firing of the multiple light sources 31a used for the image forming apparatus 5 of laser-beam bundle splitting type. Accordingly, the widths of scanning line of the photoconductors 6a to 6d can be aligned.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An optical writing device comprising:
   two or more light sources;
   a pixel clock generator configured to measure a scanning speed of one of the two or more light sources and generate a single pixel clock of a cycle corrected according to the measured scanning speed;
   a pulse data generation and output unit configured to generate pulse width data and shift data for the single pixel clock generated by the pixel clock generator to output the generated pulse width data and the generated shift data for each one of the two or more light sources; and
   a plurality of image pulse generation and output units, disposed for the two or more light sources in association with each other, configured to generate an image pulse, having a pulse width determined by the pulse width data, where a pulse timing is shifted according to the shift data,
   wherein the plurality of image pulse generation and output units are supplied with the single pixel clock in common.

2. The optical writing device according to claim 1, further comprising a polyphase clock generator configured to generate a polyphase clock signal where a phase is shifted and made different from each other by a phase difference T/P, where T denotes a cycle and P denotes a number of phase,
   wherein the pixel clock generator corrects a cycle of the single pixel clock so as to be an integral multiple of the phase difference T/P,
   wherein the pulse width data and the shift data are set so as to be an integral multiple of the phase difference T/P.

3. The optical writing device according to claim 2, further comprising a first memory configured to select m items of data from the pulse width data from the phase difference T/P×0 to the phase difference T/P×n, and store the selected m items of data and corresponding m items of selection data,
   where m denotes an integer equal to or greater than 1 and less than n+1, the phase difference T/P×0 is a minimum scale of the pulse width data, and the phase difference TP×n is a maximum scale of the pulse width data,
   wherein the pulse data generation and output unit outputs the selection data as the pulse width data,
   wherein each of the plurality of image pulse generation and output units obtains from the first memory the pulse width data corresponding to the output selection data.

4. The optical writing device according to claim 3, further comprising a second memory configured to store print-starting-point shift data for each of the two or more light sources,
   wherein each of the plurality of image pulse generation and output units shifts an image pulse of a first pixel clock in one scanning line according to the print-starting-point shift data.

5. The optical writing device according to claim 4, further comprising a third memory configured to store the pulse width data and the shift data, for the single pixel clock, of a plurality of pixels, the pulse width data and the shift data being output from the pulse data generation and output unit,
   wherein the image pulse generation and output unit outputs an image pulse corresponding to a pixel clock delayed by a prescribed number of or more pixels with reference to a pixel clock determined by the pulse width data and the shift data output from the pulse data generation and output unit.

6. An image forming apparatus comprising:
   the optical writing device according to claim 1; and
   an optical system configured to guide a plurality of laser beams emitted from the two or more light sources to scan a plurality of target surfaces with a time lag.

7. An image forming apparatus comprising:
   the optical writing device according to claim 1; and
   an optical system configured to guide a plurality of laser beams emitted from the two or more light sources to scan a target surface.

* * * * *